(12) United States Patent
Feijoo et al.

(10) Patent No.: US 11,724,742 B2
(45) Date of Patent: Aug. 15, 2023

(54) AUTOMATICALLY PARKING A VEHICLE IN A PARKING SLOT

(71) Applicant: Connaught Electronics Ltd., Tuam (IE)

(72) Inventors: German Feijoo, Tuam (IE); Bassam Abdallah, Bobigny (FR); Catherine Enright, Tuam (IE); Margaret Toohey, Tuam (IE); Jonathan Horgan, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 315 days.

(21) Appl. No.: 16/754,289

(22) PCT Filed: Oct. 12, 2018

(86) PCT No.: PCT/EP2018/077881
§ 371 (c)(1),
(2) Date: Apr. 7, 2020

(87) PCT Pub. No.: WO2019/073038
PCT Pub. Date: Apr. 18, 2019

(65) Prior Publication Data
US 2020/0339195 A1    Oct. 29, 2020

(30) Foreign Application Priority Data
Oct. 13, 2017 (DE) ...................... 10 2017 123 848.4

(51) Int. Cl.
*B62D 15/02* (2006.01)
*B60W 30/06* (2006.01)
(Continued)

(52) U.S. Cl.
CPC ......... *B62D 15/0285* (2013.01); *B60W 30/06* (2013.01); *G01S 17/89* (2013.01);
(Continued)

(58) Field of Classification Search
CPC .............. B62D 15/0285; B60W 30/06; B60W 2556/10; B60W 40/02; B60W 50/082;
(Continued)

(56) References Cited

U.S. PATENT DOCUMENTS

2019/0016331 A1* 1/2019 Carlson ................ G05D 1/0088

FOREIGN PATENT DOCUMENTS

| DE | 102011107974 A1 | 1/2013 |
| DE | 102013003117 A1 | 8/2013 |

(Continued)

OTHER PUBLICATIONS

J. Andrade-Cetto et al.: "Temporal landmark validation in CML", Proceedings / 2003 IEEE International Conference on Robotics and Automation Sep. 14-19, 2003, The Grand Hotel, Taipei, Taiwan, Jan. 1, 2003 (Jan. 1, 2003), pp. 1576-1581, XP055539628, Piscataway, NJ; DOI: 10.1109/ROBOT.2003.1241819, p. 3, col. 1, lines 24-46; ISBN: 978-0-7803-7736-3, p. 3, col. 2, lines 42-54 (6 pages).
(Continued)

*Primary Examiner* — Jeff A Burke
*Assistant Examiner* — Sihar A Karwan
(74) *Attorney, Agent, or Firm* — Osha Bergman Watanabe & Burton LLP

(57) ABSTRACT

A method for automatically parking a vehicle in a parking slot involves manually driving the vehicle into the parking slot in a training step, and thereafter automatically driving the vehicle into the parking slot in a replay step. Automatically driving the vehicle into the parking slot involves detecting information of features of the environment of the vehicle corresponding to the driven trajectory, matching feature descriptors of the detected features of the environment with feature descriptors stored in the digital map, and re-localizing the vehicle against the trajectory stored in the digital map in order to navigate the vehicle along the stored (Continued)

Figure 1:
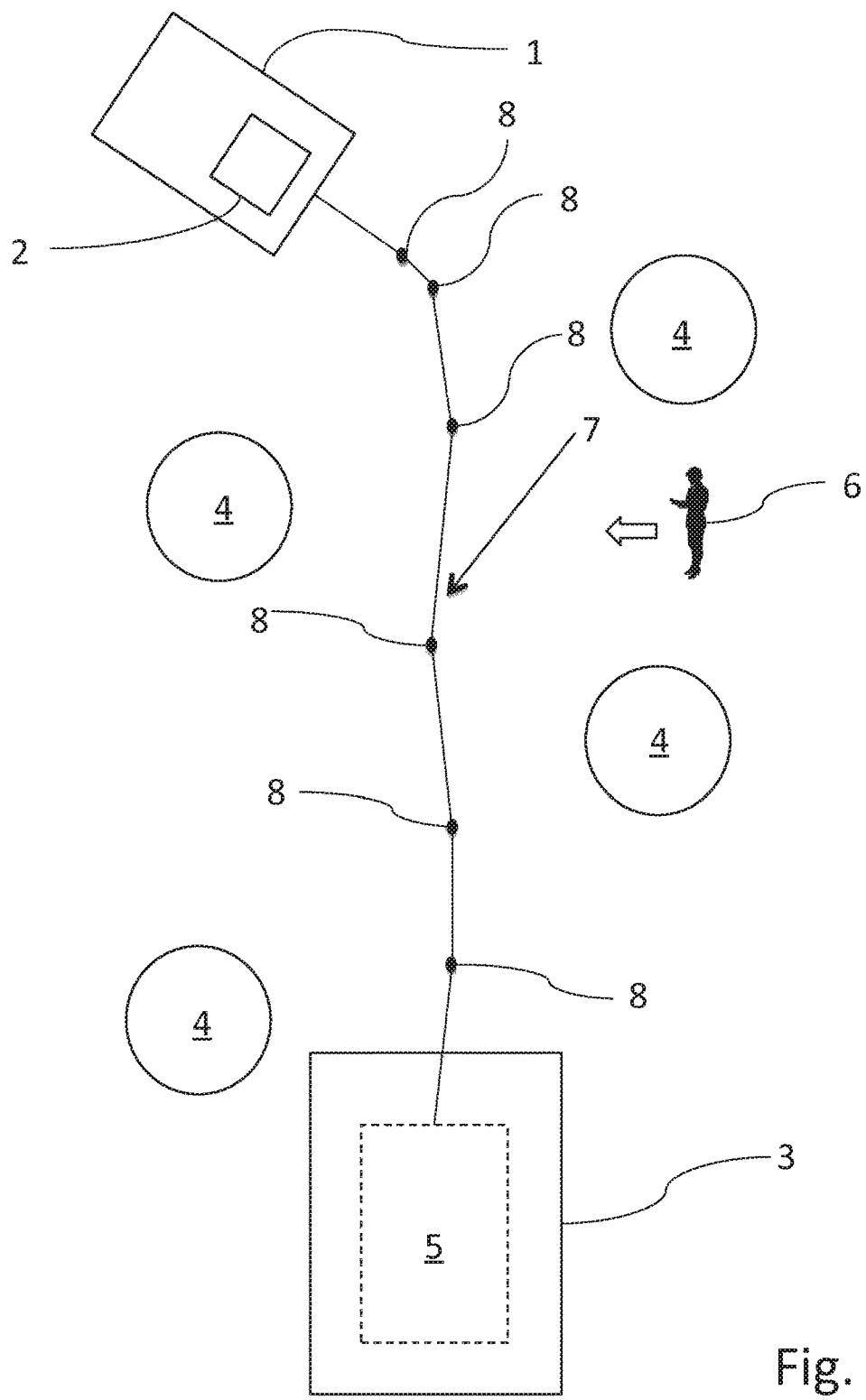

trajectory into the parking slot. Automatically driving the vehicle into the parking slot is repeated multiple times, and involves deleting a feature descriptor stored in the digital map if the number of matches does not exceed a threshold after a predefined number of repetitions.

12 Claims, 2 Drawing Sheets

(51) Int. Cl.
*G01S 17/89* (2020.01)
*G05D 1/02* (2020.01)
*G06V 20/58* (2022.01)
*G06V 10/772* (2022.01)
*G06V 10/46* (2022.01)
*G06V 10/40* (2022.01)
*G06V 10/50* (2022.01)
*G06V 20/56* (2022.01)

(52) U.S. Cl.
CPC ........... *G05D 1/0221* (2013.01); *G06V 10/40* (2022.01); *G06V 10/462* (2022.01); *G06V 10/50* (2022.01); *G06V 10/772* (2022.01); *G06V 20/56* (2022.01); *G06V 20/586* (2022.01)

(58) Field of Classification Search
CPC ........... B60W 2420/52; B60W 2420/54; G01S 17/89; G05D 1/0221; G05D 1/0061; G05D 1/0255; G05D 1/0257; G06V 20/586; G06V 10/50; G06V 20/56; G06V 10/40; G06V 10/462; G06T 7/75; G06T 2207/10016; G06T 2207/20081; G06T 2207/30241; G06T 2207/30264; B60K 2370/175; G06K 9/6255; B60Y 2300/06
See application file for complete search history.

(56) References Cited

FOREIGN PATENT DOCUMENTS

| | | |
|---|---|---|
| DE | 102012223730 A1 | 10/2013 |
| DE | 102013015348 A1 | 4/2014 |
| DE | 102015014614 A1 | 5/2016 |
| JP | 2013-530867 A | 8/2013 |

OTHER PUBLICATIONS

Chandima Dedduwa Pathiranage et al.: "T-S fuzzy model adopted SLAM algorithm with linear programming based data association for mobile robots", Soft Computing, vol. 14, No. 4, Mar. 10, 2009 (Mar. 10, 2009), pp. 345-364, XP055539569, DE-ISSN: 1432-7643, DOI: 10.1007/s00500-009-0409-1 p. 357, col. 2, lines 13-22 (20 pages).
International Search Report issued in corresponding International Patent Application No. PCT/EP2018/077881, dated Jan. 2, 2019 (4 pages).
Written Opinion issued in corresponding International Patent Application No. PCT/EP2018/077881, dated Jan. 2, 2019 (7 pages).
German Search Report issued in corresponding German Application No. 10 2017 123 848.4, dated Jul. 13, 2018 (8 pages).
Notification of Reason for Rejection in corresponding Japanese Application No. 2020-520467, dated Jul. 2, 2021 (5 pages).

* cited by examiner

AUTOMATICALLY PARKING A VEHICLE IN A PARKING SLOT

The invention relates to a method for automatically parking a vehicle in a parking slot, comprising the following steps:
manually driving the vehicle into the parking slot in a training step, and thereafter
automatically driving the vehicle into the parking slot in a replay step, wherein the step of manually driving the vehicle into the parking slot comprises the following sub steps:
detecting information of features of the environment of the vehicle corresponding to the driven trajectory,
storing the driven trajectory in a digital map of the environment, and
storing feature descriptors of detected features of the environment in the digital map,
and wherein the step of automatically driving the vehicle into the parking slot comprises the following sub steps:
detecting information of features of the environment of the vehicle corresponding to the driven trajectory
matching feature descriptors of the detected features of the environment with the feature descriptors stored in the digital map, and
re-localizing the vehicle against the trajectory stored in the digital map in order to navigate the vehicle along the stored trajectory into the parking slot.

The invention also relates to a sensor arrangement for an automatic parking system of a vehicle for automatically parking the vehicle in a parking slot and a non-transitory computer-readable medium, comprising instructions stored thereon, that when executed on a processor, induce an automatic parking system of a vehicle for automatically parking the vehicle in a parking slot.

The applicant already offers a system for automatic parking of vehicles called Park4U®. Park4U® parks a vehicle in just a few seconds. Ultrasonic sensors scan the sides of the road to detect a suitable space. The parking maneuver takes place in the usual way, but in hands-free mode. As soon as the car has stopped and the reverse gear has been engaged, the system takes over the steering, while the driver continues to control the speed of the vehicle with the accelerator and brake. During the parking maneuver, ultrasonic sensors in front and to the rear help the driver to use the available space as efficiently as possible, providing additional security. If the driver so wishes, the maneuver can be ended at any time: as soon as the steering wheel is touched, the system automatically deactivates. Park4U® has become firmly established in the marketplace. The system is constantly evolving, and now offers parking both in parallel and at an angle to the curb. A mere 40 cm to the front and rear of the vehicle are enough for the system to park. Park4U® can also help the driver exit a parking space. The system measures the space to the front and rear of the vehicle and determines the best strategy for exiting the space. While the driver controls the vehicle's speed, the system takes over the steering, just as it does in parking. It detects the best moment to exit the space and automatically deactivates to let the driver merge into the traffic.

A new category of automated parking systems is home trained parking. For home trained parking, the driver of the vehicle must train the vehicle for the particular path that he wishes the vehicle to subsequently follow to park. Modern semi-autonomous cars are already designed to park themselves. In order to do this they need to be aware of the geometry of their environment. Trained parking systems use various sensors to record information from the environment, so called "landmarks" corresponding to a driven, previously trained trajectory, and on a subsequent "replay" they relate the newly sensed information to the previously stored information to work out their position relative to the stored trajectory, which is then used to make decisions on how to maneuver the vehicle until it eventually parks at the stored parking slot location.

Retraining is required if the home scenario changes significantly over time. For example, if the seasons change, the visual look of the environment can significantly change, too, therefore requiring retraining. This change can occur gradually over time, e.g. leaves changing color, or instantaneously, e.g. a wall is knocked down. Such changes limit the lifetime of the trained system. Currently, retraining of the system consist of a manual trigger by the user launching the training mode and overwriting the existing trajectory.

It is the object of the invention to provide a method for extending the lifetime of the trained system and to reduce the occurrences of required retrainings.

This object is achieved by the subject matter of the independent claims. Preferred embodiments are described in the sub claims.

Therefore, the invention relates to a method for automatically parking a vehicle in a parking slot, comprising the following steps:
manually driving the vehicle into the parking slot in a training step, and thereafter
automatically driving the vehicle into the parking slot in a replay step, wherein the step of manually driving the vehicle into the parking slot comprises the following sub steps:
detecting information of features of the environment of the vehicle corresponding to the driven trajectory,
storing the driven trajectory in a digital map of the environment, and
storing feature descriptors of detected features of the environment in the digital map,
and wherein the step of automatically driving the vehicle into the parking slot comprises the following sub steps:
detecting information of features of the environment of the vehicle corresponding to the driven trajectory
matching feature descriptors of the detected features of the environment with the feature descriptors stored in the digital map, and
re-localizing the vehicle against the trajectory stored in the digital map in order to navigate the vehicle along the stored trajectory into the parking slot, characterized in repeating the step of automatically driving the vehicle into the parking slot for multiple times, wherein the steps of automatically driving the vehicle in the parking slot also comprise the following sub steps, respectively:
counting the matches of the feature descriptors of the detected features of the environment with the feature descriptors stored in the digital map for each feature descriptor, and
deleting a feature descriptor stored in the digital map if the number of matches for this feature descriptor does not exceed a predefined threshold after a predefined number of repetitions of the step of automatically driving the vehicle into the parking slot.

Thus, it is an essential idea of the invention to count the matches of the feature descriptors of the detected features of the environment with the feature descriptors stored in the digital map for each feature descriptor, and to delete a feature descriptor stored in the digital map if the number of matches for this feature descriptor does not exceed a predefined threshold after a predefined number of repetitions of the step of automatically driving the vehicle into the parking slot. In this way, the digital map is dynamically revised during use.

In the context of the present invention, the term "feature descriptor" relates to an algorithmic representation of how a respective feature "looks" in the digital map. If the feature was detected visually, the feature descriptor may relate to a part of a two dimensional visual image of the environment. If the feature was detected with an ultrasonic sensor, the feature descriptor may relate to an ultrasonic signal received by a respective ultrasonic sensor of the vehicle. Further, it should be noted that the invention does not require that the vehicle is automatically driven exactly along the stored trajectory. The stored trajectory is the target information which should be converged during the replay steps.

Deleting features with their feature descriptors from the digital map may already help avoiding that the automatic parking is misled by changing features or features which are not existent any more. However, the method may be greatly improved if such features are not only deleted but if the steps of automatically driving the vehicle into the parking slot also comprise the following sub step, respectively:

storing feature descriptors of detected features of the environment in the digital map.

In this way, the automatic parking dynamically learns about the changing environment by storing such features of the environment which are detected during actual use, i.e. detected during the automatic parking and not only detected during training.

According to a preferred embodiment of the invention, the steps of automatically driving the vehicle in the parking slot also comprise the following sub steps, respectively:

storing feature descriptors of detected features of the environment in the digital map only if the feature complies with a predefined quality measure. Such a quality measure may, for example, be the visual saliency of the respective feature, the noise in reconstruction, or whether it was an outlier or not. Other such quality measures are conceivable.

Further, according to a preferred embodiment of the invention, the number of feature descriptors stored during the steps of automatically driving the vehicle in the parking slot is equal or less than the number of feature descriptors deleted. In this way, an adequate operation speed of the method can be ensured.

Furthermore, according to a preferred embodiment of the invention the trajectory and all feature descriptors stored in the digital map are deleted and a training step is triggered if the number of matches of the feature descriptors of the detected features of the environment with the feature descriptors stored in the digital map is less than a predefined threshold. Hence, if the environment is not represented in the digital map in a reliable way any more, the user of the system is automatically requested to perform a new training.

According to an especially preferred embodiment of the invention the digital map comprises a spatial grid with multiple cells so as to each feature descriptor is associated with a cell of the spatial grid, wherein the steps of automatically driving the vehicle in the parking slot also comprise the following sub steps, respectively:

counting the matches of the feature descriptors of the detected features of the environment with the feature descriptors stored in the digital map for each cell of the spatial grid, and deleting a feature descriptor stored in the digital map if the number of matches for this feature descriptor does not exceed a predefined threshold after a predefined number of repetitions of the step of automatically driving the vehicle into the parking slot only if the matches in the cell to which this feature descriptor is associated does not exceed a predefined threshold. Preferably the cells all have the same size.

This makes the method even more robust by identifying how reliable a respective feature with its feature descriptor in the digital map actually is. In this respect, according to another preferred embodiment of the invention, a feature is defined as a backbone feature, the feature descriptor of which cannot be deleted in the digital map, if after a predefined number of repetitions of the step of automatically driving the vehicle into the parking slot the number of matches for this feature descriptor exceeds a predefined threshold and if the matches in the cell to which this feature descriptor is associated also exceeds a predefined threshold. Therefore, after some repetitions of the replay steps the group of backbone features is frozen.

Further, according to a preferred embodiment of the invention, the cells are weighted according to the matches in each cell, respectively, and the time when the method is mature enough for robustly performing the replay step is identified by identifying that the deviation in the weight of the cells is less than a predefined threshold. Then, the user of the method may be informed that method is now robust enough for reliable use.

The digital map may be represented in different ways. According to a preferred embodiment of the invention, the digital map is comprised of multiple frames which are associated with consecutive points in time, the frames being a two dimensional digital representation of the environment of the driven trajectory. In case of a visual representation, the digital map could be comprised of multiple frames of a video which is taken by a camera when driving along the trajectory.

Further, different kinds of sensors and detectors may be used for detecting the features of the environment. Especially, different kinds of sensors and detectors for automatic parking may be used together. According to a preferred embodiment of the invention, the detected information of features of the environment of the vehicle is represented by visual data, ultrasonic data and/or LIDAR data.

The invention also relates to a sensor arrangement for an automatic parking system of a vehicle for automatically parking the vehicle in a parking slot, the sensor arrangement being adapted for a method comprising the following steps:

manually driving the vehicle into the parking slot in a training step, and thereafter automatically driving the vehicle into the parking slot in a replay step, wherein the step of manually driving the vehicle into the parking slot comprises the following sub steps:

detecting information of features of the environment of the vehicle corresponding to the driven trajectory, storing the driven trajectory in a digital map of the environment, and storing feature descriptors of detected features of the environment in the digital map, and wherein the step of automatically driving the vehicle into the parking slot comprises the following sub steps:

detecting information of features of the environment of the vehicle corresponding to the driven trajectory matching feature descriptors of the detected features of the environment with the feature descriptors stored in the digital map, and re-localizing the vehicle against the trajectory stored in the digital map in order to navigate the vehicle along the stored trajectory into the parking slot, characterized in repeating the step of automatically driving the vehicle into the parking slot for multiple times, wherein the steps of automatically driving the vehicle in the parking slot also comprise the following sub steps, respectively:

counting the matches of the feature descriptors of the detected features of the environment with the feature descriptors stored in the digital map for each feature descriptor, and deleting a feature descriptor stored in the digital map if the number of matches for this feature descriptor does not exceed a predefined threshold after a predefined number of repetitions of the step of automatically driving the vehicle into the parking slot.

The invention also relates to a non-transitory computer-readable medium, comprising instructions stored thereon, that when executed on a processor, induce an automatic parking system of a vehicle for automatically parking the vehicle in a parking slot to perform the steps of:

manually driving the vehicle into the parking slot in a training step, and thereafter automatically driving the vehicle into the parking slot in a replay step, wherein the step of manually driving the vehicle into the parking slot comprises the following sub steps:

detecting information of features of the environment of the vehicle corresponding to the driven trajectory, storing the driven trajectory in a digital map of the environment, and storing feature descriptors of detected features of the environment in the digital map, and wherein the step of automatically driving the vehicle into the parking slot comprises the following sub steps:

detecting information of features of the environment of the vehicle corresponding to the driven trajectory matching feature descriptors of the detected features of the environment with the feature descriptors stored in the digital map, and re-localizing the vehicle against the trajectory stored in the digital map in order to navigate the vehicle along the stored trajectory into the parking slot, characterized in repeating the step of automatically driving the vehicle into the parking slot for multiple times, wherein the steps of automatically driving the vehicle in the parking slot also comprise the following sub steps, respectively:

counting the matches of the feature descriptors of the detected features of the environment with the feature descriptors stored in the digital map for each feature descriptor, and deleting a feature descriptor stored in the digital map if the number of matches for this feature descriptor does not exceed a predefined threshold after a predefined number of repetitions of the step of automatically driving the vehicle into the parking slot.

Preferred embodiments of the sensor arrangement and of the non-transitory computer-readable medium correspond to the preferred embodiments of the method described further above.

These and other aspects of the invention will be apparent from and elucidated with reference to the embodiments described hereinafter. Individual features disclosed in the embodiments con constitute alone or in combination an aspect of the present invention. Features of the different embodiments can be carried over from one embodiment to another embodiment.

Figure 2:
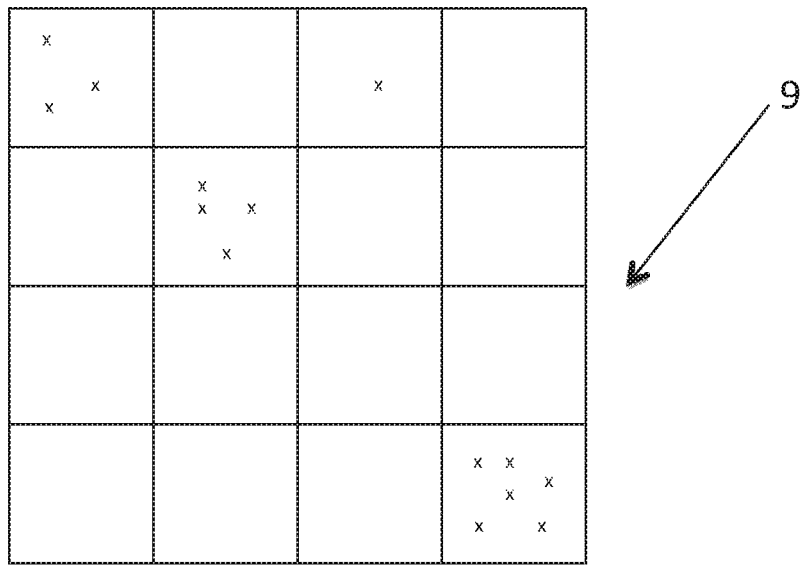
Figure 3:
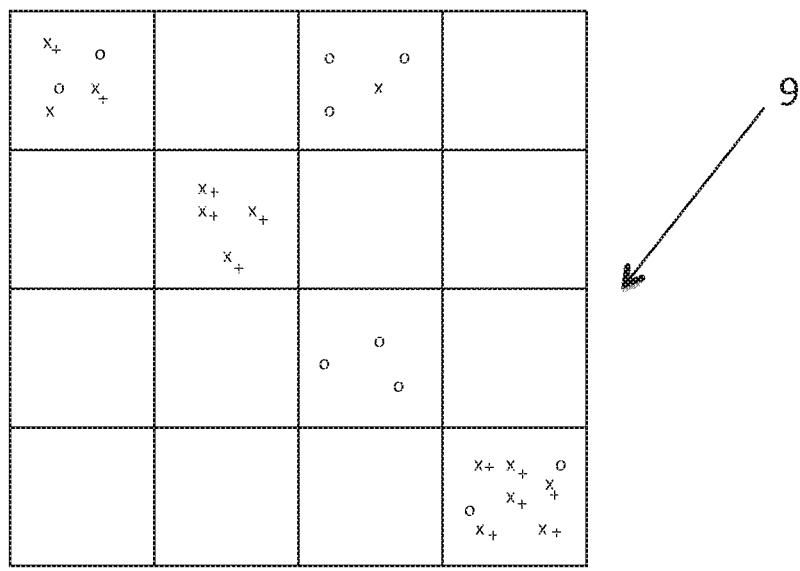

In the drawings:

FIG. 1 schematically depicts a situation in which a method according to a preferred embodiment of the invention is used, FIG. 2 schematically depicts a digital map with a spatial grid and feature descriptors in it directly after training, and FIG. 3 schematically depicts the digital map with the spatial grid and feature descriptors in it directly after replay.

From FIG. 1 schematically a scene in which a method according to a preferred embodiment of the invention is used can be seen. A vehicle 1 is equipped with a sensor arrangement 2 of an automatic parking system for automatically parking the vehicle 1 in a parking slot 3 in a desired position 5. This desired position 5 in the parking slot can be reached via a trajectory 7, shown with its trajectory points 8, which the vehicle 1 has to follow. This trajectory 7 is saved in a digital map 9 schematically shown FIGS. 2 and 3 after a training step and can then be used in replay steps thereafter in order to automatically drive the vehicle 1 into the desired position 5 in the parking slot 3.

The sensor arrangement 2 comprises a camera for visually detecting the environment of the vehicle 1 along the trajectory 7. In the present example, features of the environment are given by trees 4 and a person 6 which may move into the way of the vehicle 1. Additional features of the environment may be walls of a building or the boundary of the street the vehicle is driving on.

According to a preferred embodiment of the invention, a solution to update a trained trajectory and to extend its valid lifetime is provided. This will help to avoid the need to manually retrain unless the scene changes drastically. But, if that is the case, the same approach can be used to automatically trigger retrain the vehicle 1 for parking. According to the present preferred embodiment the method is using camera-based home parking.

According to conventional methods, retraining of the system consist of a manual trigger by the user launching the training mode and overwriting the existing trajectory 7. Retraining is required if the home scenario changes significantly over time. For example, if the seasons change, the visual look of the environment can significantly change, therefore requiring retraining. This change can occur gradually over time, e.g. leaves changing color, or instantaneously, e.g. when a wall is knocked down.

The method according to the preferred embodiment of the invention automatically recognizes the scene and updates the representation to ensure the trained trajectory remains valid over time. This method also handles the case where the scene suddenly changes significantly. Rather than simply failing to replay, the method automatically notifies the driver that the trajectory 7 may be invalid and requests the driver to re-execute the training step.

The driver trains the vehicle 1 by driving into the parking slot 3 and selecting to save the trajectory 7. In the replay step the algorithm recognizes the scene and replays the trained trajectory 7. In the training step the system records a digital map 9 of both features in the scene and trajectory points 8. In the replay step the system matches features in the current view to the features in the trained digital map 9 and estimates the position of the vehicle 1 relative to the trained trajectory points 8.

The preferred embodiment of the invention described here uses a sensor arrangement 2 with a camera as the input sensor yielding videos with multiple video frames. However the method could equally be applied to systems with other sensor inputs, as already set out above. If a given feature is observed in more than one video frame in the training step, then it can have more than one visual descriptor associated with it.

In the training step, a set of feature descriptors is stored for each feature in the digital map 9 of trained trajectory points 8. In the replay phase, a new set of features is found, and each feature has an additional feature descriptor. Based on the feature descriptors, the method matches the new features to the trained features, and subsequently uses this information to re-localize the vehicle 1 against the trained trajectory 7.

According to the preferred embodiment of the invention, the features extracted from an object that will stay on the scene permanently, e.g. a house, walls, or a sculpture, will always be there and it is valid to consider them as the best ones to keep in the trained digital map 9. According to the method described here, these features are identified and tagged as backbone features.

Once the trajectory 7 was trained it can replayed. During this replay the detected features are matched to the trained digital map 9. The digital map 9 is provided with a spatial grid with multiple cells which all have the same size as schematically depicted in FIGS. 2 and 3. As these features and their locations are known, they can be placed in the grid and it can be quantified where, i.e. in which cells, they are located. After one replay there will be a rough understanding of the scene and a digital map 9 with the spatial grid can be generated where each cell is weighted according to the number of features matched during replay. To refine this description of the scene several replays are done, which happen while the user uses the method on its normal use case, and after some numbers of tries, the digital map with the grid can be considered mature. Rules can be used to identify when the grid is mature enough, for example, by setting a threshold on a maximum deviation in the weight of the cells after one replay. Other appropriate measures can be implemented.

This preferred embodiment of the invention uses a weighting method for the spatial grid. One such method is described in the following. Taking the first replay after training, at this point of time, the digital map with the grid for the scene contains only the trained features. They are located spatially on the grid, and identified by "x" in FIG. 2.

According to the preferred embodiment of the invention, two types of counters are used: one counter per cell and one counter per feature. At the start, these counters are both set to 0. The logic to update the counters is to increment the per-cell counter each time a feature inside that cell is matched, and also increment the appropriate per-feature counter. This situation is shown in FIG. 3. Features obtained running replay are identified by "+" and "o", respectively, wherein "+" denotes a detected feature with a match and "o" denotes a detected feature without a match.

The result of the weighting process per cell after the first replay runs is as follows: The cell given by the first row from the left and the first line from above has a counter of "2". The cell given by the second row from the left and the second line from above has a counter of "2". The cell given by the fourth row from the left and the fourth line from above has a counter of "6". For the other cells there are no matches. Thus, these cells have a counter of "0".

Each feature from training has its own counter, i.e. the per-feature counter, and that one will be increased each time the feature was matched with a feature in replay. This logic is applied for several replays in order to detect the moment when the digital map 9 is mature enough to be able to classify the trained features into two groups, persistent, so called backbone features, and non-persistent features, i.e. modifiable features. From this moment, the method continues to update the counters up to a defined maximum threshold to handle the adding of new features and the deletion of obsolete features. However the group of features classified as persistent features will be frozen at this point of time.

In the following, dynamic retraining and triggering a retraining is described. As the visual appearance of the scene could change significantly between training and replay, as a consequence the feature descriptors will also change significantly or even a different feature set will be extracted. For example, the visual nature of the features in an outdoor scene would change as the seasons change. This will make replay either noisy, i.e. accuracy will be lower for the estimated vehicle position and orientation, or the replay may fail in total. For the present case, it is assumed that this change will be gradual, such that there will be adequate opportunity for the method to adapt before the change in the environment makes replay unsuccessful.

It is the approach of the preferred embodiment of the invention described here to dynamically adapt the trained stored data, i.e. the features and their feature descriptors, by using the extra-knowledge of the scene provided by the grid described above. Adaption is carried out as follows: Features that are never or rarely observed in replay are dynamically deleted. A trained feature could be deleted in order to adapt the trained trajectory 7 to the scene if it was previously classified in the grid as a modifiable feature and belongs to a cell with low weight.

Dynamic addition of new features to the trained feature set is as follows: Each time in replay, features that are not observed in the stored feature set can be found. It is likely that these are due to new objects in the scene, or due to an object that has changed properties. These features are added to the set of features to be used in subsequent replay modes. This method of dynamic retraining obviates the need for any specific retraining mode to be entered, as the dynamic retraining happens at every replay. Due to memory and processing restrictions, the number of features that can be added to the training set is limited. According to the preferred embodiment of the invention described here, none of the features classified as backbone features can be deleted. It is only allowed to remove the features previously classified as non-persistent features that belong to a cell with low weight. So the number of features that are added during the dynamic retraining is equal or less than the number removed.

The selection of new features to add can be based on some criteria defining the overall quality of that feature for replay, e.g. visual saliency, noise in reconstruction, whether it was an outlier or not, etc. Even with this gradual adaptation of the stored trajectory 7 using this dynamic retraining, the situation where the replay may fail can occur. According to the preferred embodiment of the invention this situation can be detected, for example, by thresholding the ratio of new features to add by the matched features. In this case a manual retraining can automatically be triggered. The user will be informed and requested to re-do the training sequence. All the information stored in the system will be reset and will behave as the first time run in the vehicle. □

REFERENCE SIGNS LIST 1 vehicle
2 sensor arrangement
3 parking slot
4 trees
5 desired position
6 person
7 trajectory
8 trajectory points
9 digital map

The invention claimed is:

1. A method for automatically parking a vehicle in a parking slot, comprising:
   manually driving the vehicle into the parking slot in a training step; and
   thereafter, automatically driving the vehicle into the parking slot in a replay step,
   wherein the step of manually driving the vehicle into the parking slot comprises:
      detecting information of features of the environment of the vehicle corresponding to the driven trajectory,
      storing the driven trajectory in a digital map of the environment, and
      storing feature descriptors of detected features of the environment in the digital map, and
   wherein the step of automatically driving the vehicle into the parking slot comprises:
      detecting information of features of the environment of the vehicle corresponding to the driven trajectory,
      matching feature descriptors of the detected features of the environment with the feature descriptors stored in the digital map, and
      re-localizing the vehicle against the trajectory stored in the digital map in order to navigate the vehicle along the stored trajectory into the parking slot,
   repeating the step of automatically driving the vehicle into the parking slot for multiple times, further comprising:
      counting a number of matches of the feature descriptors of the detected features of the environment with the feature descriptors stored in the digital map for each feature descriptor, wherein the number of matches is a non-negative integer, and
      deleting a feature descriptor stored in the digital map based on determining that the number of matches for this feature descriptor does not exceed a predefined threshold after a predefined number of repetitions of the step of automatically driving the vehicle into the parking slot.

2. The method according to claim 1, wherein automatically driving the vehicle into the parking slot further comprises:
   storing feature descriptors of detected features of the environment in the digital map.

3. The method according to claim 2, wherein automatically driving the vehicle in the parking slot further comprises:
   storing feature descriptors of detected features of the environment in the digital map based on determining that the feature complies with a predefined quality measure.

4. The method according to claim 2, wherein the number of feature descriptors stored during the steps of automatically driving the vehicle in the parking slot is equal or less than the number of feature descriptors deleted.

5. The method according to claim 2, further comprising:
   deleting the trajectory and all feature descriptors stored in the digital map and triggering a training step based on determining that the number of matches of the feature descriptors of the detected features of the environment with the feature descriptors stored in the digital map is less than a predefined threshold.

6. The method according to claim 1, wherein the digital map comprises a spatial grid with multiple cells and each feature descriptor is associated with a cell of the spatial grid, wherein the steps of automatically driving the vehicle in the parking slot further comprising:
   counting the matches of the feature descriptors of the detected features of the environment with the feature descriptors stored in the digital map for each cell of the spatial grid, and
   deleting a feature descriptor stored in the digital map based on determining that the number of matches for this feature descriptor does not exceed a predefined threshold after a predefined number of repetitions of the step of automatically driving the vehicle into the parking slot based on determining that the matches in the cell to which this feature descriptor is associated does not exceed a predefined threshold.

7. The method according to claim 6, further comprising:
   defining a feature as a backbone feature, the feature descriptor of which cannot be deleted in the digital map, if after a predefined number of repetitions of the step of automatically driving the vehicle into the parking slot the number of matches for this feature descriptor exceeds a predefined threshold and if the matches in the cell to which this feature descriptor is associated also exceeds a predefined threshold.

8. The method according to claim 6, further comprising:
   weighting the cells according to the matches in each cell, respectively,
   identifying the time based on determining that the method is mature for robustly performing the replay step by identifying that the deviation in the weight of the cells is less than a predefined threshold.

9. The method according to claim 1, wherein the digital map is comprised of multiple frames which are associated with consecutive points in time, the frames being a two dimensional digital representation of the environment of driven trajectory.

10. The method according to claim 1, wherein detected information of features of the environment of the vehicle is represented by visual data, ultrasonic data and/or LIDAR data.

11. A sensor arrangement for an automatic parking system of a vehicle for automatically parking the vehicle in a parking slot, the sensor arrangement being configured to:
   manually drive the vehicle into the parking slot in a training step, and
   thereafter, automatically drive the vehicle into the parking slot in a replay step,
   wherein manually driving the vehicle into the parking slot comprises
      detecting information of features of the environment of the vehicle corresponding to the driven trajectory,
      storing the driven trajectory in a digital map of the environment, and
      storing feature descriptors of detected features of the environment in the digital map, and wherein the step of automatically driving the vehicle into the parking slot comprises:
  detecting information of features of the environment of the vehicle corresponding to the driven trajectory
  matching feature descriptors of the detected features of the environment with the feature descriptors stored in the digital map, and
  re-localizing the vehicle against the trajectory stored in the digital map in order to navigate the vehicle along the stored trajectory into the parking slot,
repeating the step of automatically the vehicle into the parking slot for multiple times, further:
  counting a number of matches of the feature descriptors of the detected features of the environment with the feature descriptors stored in the digital map for each feature descriptor, wherein the number of matches is a non-negative integer, and
  deleting a feature descriptor stored in the digital map if the number of matches for this feature descriptor does not exceed a predefined threshold after a predefined number of repetitions of the step of automatically driving the vehicle into the parking slot.

12. A non-transitory computer-readable medium, comprising instructions stored thereon, that when executed on a processor, induce an automatic parking system of a vehicle for automatically parking the vehicle in a parking slot to perform a method comprising:
  manually driving the vehicle into the parking slot in a training step; and thereafter, automatically driving the vehicle into the parking slot in a replay step,
  wherein the step of manually driving the vehicle into the parking slot comprises:
    detecting information of features of the environment of the vehicle corresponding to the driven trajectory,
    storing the driven trajectory in a digital map of the environment, and
    storing feature descriptors of detected features of the environment in the digital map, and
  wherein the step of automatically driving the vehicle into the parking slot comprises:
    detecting information of features of the environment of the vehicle corresponding to the driven trajectory
    matching feature descriptors of the detected features of the environment with the feature descriptors stored in the digital map, and
    re-localizing the vehicle against the trajectory stored in the digital map in order to navigate the vehicle along the stored trajectory into the parking slot,
  repeating the step of automatically driving the vehicle into the parking slot for multiple times, further comprising:
    counting a number of matches of the feature descriptors of the detected features of the environment with the feature descriptors stored in the digital map for each feature descriptor, wherein the number of matches is a non-negative integer, and
    deleting a feature descriptor stored in the digital map based on determining that the number of matches for this feature descriptor does not exceed a predefined threshold after a predefined number of repetitions of the step of automatically driving the vehicle into the parking slot.

* * * * *